US012784388B2

(12) United States Patent
Chan

(10) Patent No.: US 12,784,388 B2
(45) Date of Patent: Nov. 3, 2026

(54) METHOD AND SYSTEM USING LOW-RESOLUTION INFRARED DEVICES FOR DETECTION, COUNTING, AND TRACKING

(71) Applicant: String Dynamic Limited, Hong Kong (HK)

(72) Inventor: Chi Ho Chan, Hong Kong (HK)

(73) Assignee: String Dynamic Limited, Hong Kong (HK)

( * ) Notice: Subject to any disclaimer, the term of this patent is extended or adjusted under 35 U.S.C. 154(b) by 164 days.

(21) Appl. No.: 18/943,966

(22) Filed: Nov. 12, 2024

(65) Prior Publication Data

US 2026/0134651 A1 May 14, 2026

(51) Int. Cl.

*G06T 7/194* (2017.01)
*G06T 3/4007* (2024.01)
*G06T 5/50* (2006.01)
*G06T 5/70* (2024.01)
*G06T 7/246* (2017.01)
*G06T 7/292* (2017.01)
*G06V 10/14* (2022.01)
*G06V 10/26* (2022.01)
*G06V 40/10* (2022.01)

(52) U.S. Cl.

CPC ............ *G06V 10/14* (2022.01); *G06T 3/4007* (2013.01); *G06T 5/50* (2013.01); *G06T 5/70* (2024.01); *G06T 7/194* (2017.01); *G06T 7/248* (2017.01); *G06T 7/292* (2017.01); *G06V 10/26* (2022.01); *G06V 40/10* (2022.01); *G06T 2207/10048* (2013.01); *G06T 2207/20216* (2013.01); *G06T 2207/30196* (2013.01); *G06T 2207/30232* (2013.01); *G06T 2207/30242* (2013.01); *G06V 2201/07* (2022.01)

(58) Field of Classification Search

CPC ........ G06V 10/14; G06V 10/26; G06V 40/10; G06V 2201/07; G06V 20/52; G06T 3/4007; G06T 5/50; G06T 5/70; G06T 7/194; G06T 7/248; G06T 7/292; G06T 2207/10048; G06T 2207/20216; G06T 2207/30196; G06T 2207/30232; G06T 2207/30242

USPC .......................................................... 382/103

See application file for complete search history.

(56) References Cited

U.S. PATENT DOCUMENTS 12,100,162 B2 * 9/2024 Li ............................. G06T 7/11
2006/0208169 A1 * 9/2006 Breed .................. B60N 2/0022 250/221
2006/0269103 A1 * 11/2006 Brown ................... G06V 20/53 382/103
2013/0136358 A1 * 5/2013 Dedhia ..................... G06T 7/12 382/173
2014/0071242 A1 * 3/2014 Lin ......................... G06T 7/254 348/46
2016/0005182 A1 * 1/2016 Ashani .................... G06T 7/194 382/173

(Continued)

FOREIGN PATENT DOCUMENTS

CN 102750539 10/2012
CN 105844649 8/2016
CN 106600777 4/2017

*Primary Examiner* — Ali Bayat
(74) *Attorney, Agent, or Firm* — JMB Davis Ben-David

(57) ABSTRACT

Described herein are detection devices, and more particularly, methods and systems using low-resolution infrared devices for detection, counting, and tracking.

10 Claims, 4 Drawing Sheets

(56) References Cited

U.S. PATENT DOCUMENTS

| | | | | |
|---|---|---|---|---|
| 2016/0065930 | A1* | 3/2016 | Chandra | G06T 5/30<br>348/46 |
| 2017/0076171 | A1 | 3/2017 | Yin | |

* cited by examiner (a) (b) (c) (d) (e)

(a) (b)

METHOD AND SYSTEM USING LOW-RESOLUTION INFRARED DEVICES FOR DETECTION, COUNTING, AND TRACKING

FIELD

The present application is related to detection devices, particularly to methods and systems using low-resolution infrared devices for detection, counting, and tracking.

BACKGROUND

The technology for detecting, counting, and/or tracking living creature, especially humans, can provide valuable information for many applications. For instance, energy conservation in commercial buildings (activating cooling and ventilation to varying degrees based on the number of people inside the building), crowd flow control (such as preventing stampedes caused by excessive foot traffic), and healthcare monitoring (like bedside monitoring, fall detection). Currently, there are various methods to achieve it, which typically involve recording video or images with cameras. However, due to privacy concerns, camera-based methods are unacceptable in some applications, such as monitoring the safety of the elderly at home or in elderly centers. Therefore, it is necessary to develop devices and methods that achieve accurate biological detection, counting, and tracking without relying on cameras.

SUMMARY OF THE INVENTION

The present invention aims to detect target objects (such as living beings) using low-resolution infrared devices, particularly to provide accurate detection, counting, and tracking functions for living beings (such as humans), especially in situations involving privacy concerns (e.g., homes and elderly centers).

The detection method provided by the present invention using low-resolution infrared devices includes the following steps:

S1: For each low-resolution infrared frame obtained, performing background removal according to preset rules to obtain an infrared frame that retains the pixels of the target object;

S2: Performing averaging treatment on the infrared frame after background removal;

S3: Enhancing the resolution of the infrared frame after averaging treatment;

S4: Extracting the foreground object;

S5: Comparing the pixel count or proportion of the foreground object with a preset value; if the pixel count or proportion of the foreground object exceeds the preset value, confirm the detection of the target object.

The present invention uses low-resolution infrared devices and, through the aforementioned treatment of the infrared frames, not only uses low-cost low-resolution infrared detection devices but also uses appropriate algorithms to overcome the issues of insufficient precision and low accuracy caused by low-resolution infrared devices. It allows the system to have low cost and high-precision detection effects without causing user privacy exposure issues.

On the basis of the above method, the present invention further provides a method for counting and tracking target objects using low-resolution infrared devices. The counting method using a low-resolution infrared device, comprises the above detection method, and also comprises:

S6: Using fast radial symmetry in the infrared frame to find seed points and obtain the number of target objects.

The tracking method using a low-resolution infrared device, comprises the above counting method, and also comprises:

S7: Analyzing the position, direction, and speed of seed points recorded in infrared frames from different devices, and tracking the same target object by considering seed points with similar direction and speed as the same target object.

The present invention also provides a system for detection, counting, and tracking using the above methods.

DETAILED DESCRIPTION

The embodiment of the present invention provides a system for detecting, counting, and tracking using low-resolution infrared devices. The system can be used to detect, count, and track target objects. Since the system uses infrared devices, the target objects should have some distinction from the environment in infrared radiation. In the present embodiment, the target objects are living beings, such as humans. The system can provide accurate biological detection, counting, and tracking, especially in situations where there are privacy concerns (e.g., at home and in healthcare centers). Therefore, the system can be applied in homes, healthcare centers, and commercial buildings.

For example: In homes and healthcare centers, the system can perform bedside monitoring to detect the occupancy of elderly people's beds, preventing the elderly (especially those with dementia who cannot return to bed after leaving home) from leaving their beds without the knowledge of caregivers; to perform safety monitoring for falls and other incidents, and to notify caregivers in time if an elderly person falls; to alert in case of abnormal high temperatures in the kitchen or other areas of the home. The system can also be used in buildings, such as adjusting the power of the air conditioning inside the building according to the number of people in the room; better utilization of facilities (including meeting rooms) by detecting the occupancy status of the room (whether there are people).

In the embodiment, the system includes an infrared device and a processor. The infrared device are connected to the processor via wired or wireless communication to transmit the images obtained by the infrared device to the processor.

In the embodiment, the system uses multiple low-resolution infrared devices, such as infrared sensors. Infrared sensors can capture infrared radiation in the environment and output it in the form of image frames according to the intensity of the infrared radiation. Compared with camera-based devices, using low-resolution infrared devices can protect privacy and reduce costs. Compared with high-resolution infrared devices, low-resolution infrared devices are less expensive.

Figure 1:
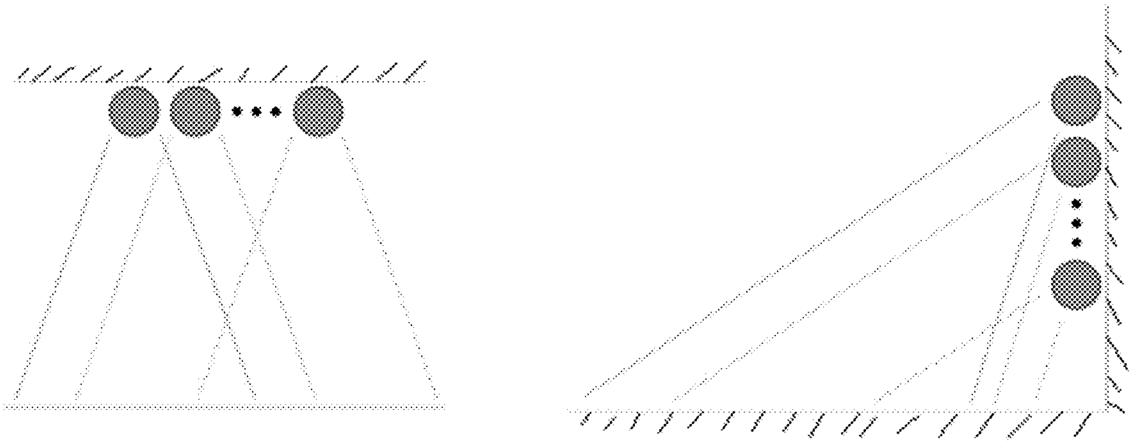
FIG. 1 shows a schematic diagram of the arrangement of the infrared devices.

The low-resolution infrared devices used in the system typically refer to devices with a resolution lower than 50×50=2500 pixel points. Each infrared device can cover a specific angle of view. As shown in FIG. 1, the infrared devices of the system (for example, infrared sensors, represented as circles in FIG. 1) can be arranged on the ceiling or walls, with the detection direction facing the interior of the room. The detection ranges of each infrared sensor can overlap to some extent to ensure complete coverage of the detection area. In the embodiment, each infrared sensor is an 8×8 infrared pixel (64 resolution), detecting an area of 3.6 meters by 3.6 meters. Each infrared pixel represents the infrared intensity of an area of about 45 centimeters by 45 centimeters. In other applications, infrared sensors of different resolutions can be used according to the detection environment and purpose.

Figure 2:
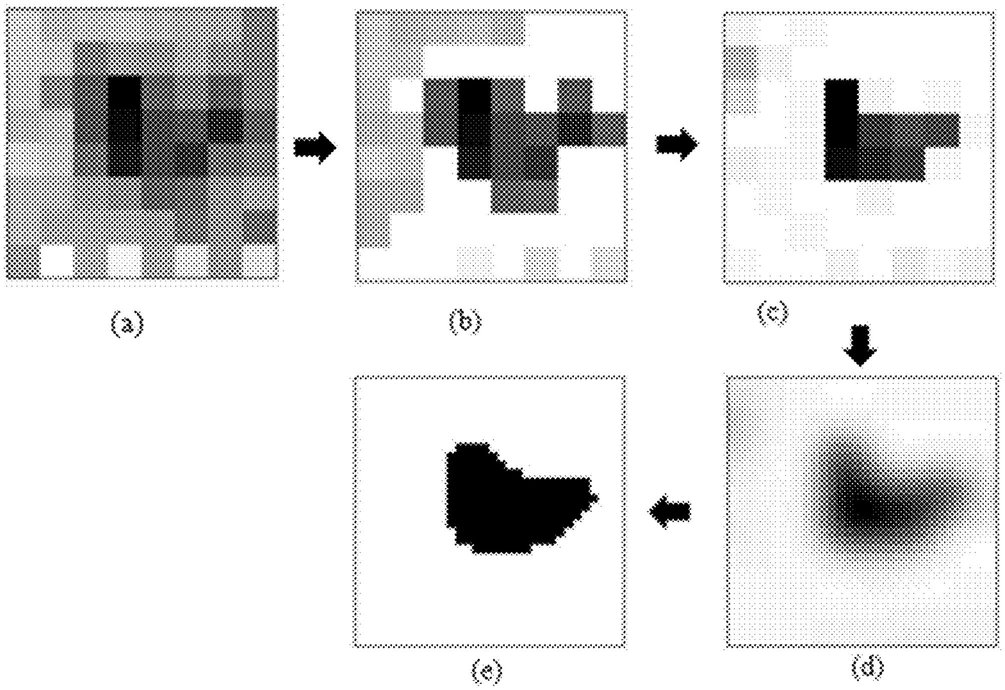
FIG. 2 shows the results after the infrared frames have been processed through different steps (panels (a) to (e)).

As shown in FIG. 2, the system first preprocesses the images obtained by the low-resolution infrared devices, which includes:

S1: Background Removal

In this step, the infrared frames (as shown in FIG. 2*a*) obtained by the infrared device are processed according to preset rules, setting some pixel points as the background to preliminarily distinguish them from the pixels of the target object.

This step includes: collecting infrared frames from each infrared device, and taking the average value of each pixel value in each infrared frame. For each infrared frame, if a pixel's pixel value is within a preset range around the average value, this pixel is set as the background, and the pixel value of the background pixels is set to 0, while retaining the non-background pixel values. The processed image is shown in FIG. 2*b*.

If there are X pixels in an infrared frame, with pixel values A1, A2, A3, . . . , AX, respectively. The system first calculates the average value Aa. The system can preset a first threshold B, and set Aa±B as the range for background pixels value. That is, the system sets pixels with values within Aa±B as background pixels, sets the pixel values of background pixels to 0, and does not process them in subsequent processing steps. The system sets the values that exceed the range of Aa±B as values to be retained. In other embodiment, two threshold values can also be set, such as B1 and B2, as the upper and lower limits of the background pixel values, respectively. The range for background pixels value is Aa+B1 to Aa−B2.

Generally speaking, the pixel values in the area where the target object is located will be higher than those in the surrounding environment, so through the above steps, the system can preliminarily distinguish the pixels of the target object from the surrounding environment, and the above method is simple and easy to implement, with low computational cost. The low-resolution infrared devices used in the embodiment have relatively lower fluctuation stability and accuracy of detection values compared to high-resolution infrared devices, but the fluctuation stability and accuracy of each pixel value in a single infrared frame obtained by the low-resolution infrared devices are consistent. Therefore, this method can avoid the above shortcomings of low-resolution infrared devices by preprocessing each infrared frame using the above method, and can better distinguish between the target object and the environment. The above method can also preset different threshold values according to different environments and target objects to improve the completeness and accuracy of the separation of the target object.

In other embodiment, other methods can also be used, such as the standard deviation method. By calculating the average value and standard deviation of the pixel values, the values that are more than a preset multiple of the standard deviation from the average value are set as non-background pixel values and retained; while the values within the preset standard deviation range are set as background pixel values and removed.

S2: Minimizing Temperature Detection Errors

This step includes: continuing the average processing of the infrared frames from which the background has been removed in step S1. The image after average processing is shown in FIG. 2*c*.

Specifically, it is the pixel values of the infrared frames from which the background has been removed (i.e., the non-background pixel values after processing in S1) that are processed again by averaging.

S3: Enhancing Resolution

Since the system uses low-resolution infrared devices, the system further processes the values obtained from S2 to improve accuracy. The processed image is shown in FIG. 2*d*. The specific steps include:

S3.1: Interpolating the infrared frames processed by S2 to achieve a higher resolution and precision image, thereby obtaining a more accurate heat source location. For example, after increasing the resolution, the pixel values of the newly added pixels are set to the average value of the surrounding pixel values. In other embodiment, various mature interpolation methods currently available can also be applied, such as Nearest Neighbor Interpolation, Bilinear Interpolation, Bicubic Interpolation, Lanczos Interpolation, Gaussian Interpolation, etc.

S3.2: After interpolating the infrared frame, filtering is applied to make the image smoother.

In the embodiment, a Gaussian filter is used to process the interpolated infrared frames to make the image smoother. In other embodiments, other filtering methods can also be used for processing, such as Mean Filter, Bilateral Filter, Non-local Means Filter, etc.

Different interpolation and filtering methods can be selected for processing according to different application environments and the characteristics of the target objects to obtain a smoother image.

S4: Extracting Foreground Objects

Through this step, the system can extract the target objects (i.e., foreground objects) and complete the image preprocessing work. The processed image is shown in FIG. 2*e*.

In the embodiment, the Otsu binarization algorithm is used for threshold processing to extract the foreground. Since the Otsu binarization algorithm is maturely applied in the field of image processing, its specific application method is not described in detail here. By using the Otsu binarization algorithm for threshold processing, image binarization segmentation can be achieved by maximizing inter-class variance. Specifically, the algorithm divides the grayscale values of the image into two parts: foreground and background, and by calculating the inter-class variance under different threshold values, the threshold that maximizes the inter-class variance is selected as the segmentation point. This method is simple in calculation and not affected by the brightness and contrast of the image. In addition to using the Otsu binarization algorithm, other threshold setting methods can also be used for processing in other embodiments, such as the average value method or the bi-modal method, etc., or by manually preset threshold values for further processing.

As shown in FIG. 2, the steps S1-S4 can be referred to as preprocessing. Through preprocessing, the system can obtain a smoother and higher precision foreground extraction image from the infrared frames obtained from low-resolution infrared devices.

After preprocessing, the system can further process the foreground extraction image, including target object detection, counting, and tracking, etc.

S5: Target Object Detection

This step mainly uses the image processed after S4 to detect the extracted foreground objects.

In this embodiment, the target objects are living beings, such as humans. Biological detection mainly involves analyzing the number of pixels of the extracted foreground objects. If the number of pixels of the extracted foreground object is greater than a preset number of pixels, this means that the foreground object is large enough to be considered a target object. If the number of pixels of the extracted foreground object is less than the preset number of pixels, it indicates that the extracted foreground object is not a target object. In this embodiment, the number of pixels of the extracted foreground object can usually be set to 20% of the image area.

In other embodiments, the target objects can also vary according to different needs. For example, the system can be used to detect fire sources, etc. If the target objects are different, the preset parameters in this step also need to be adjusted accordingly.

The detection of target objects can be processed on a single infrared frame obtained from a single infrared device to obtain the target objects within the range corresponding to the single infrared device.

S6: Target Object Counting

Based on S5, the system can counts the number of target objects in the target area, so as to make corresponding settings. For example, in a building, the system adjust the air conditioning power according to the number of people in the target area. In this embodiment, the target objects are living beings, so it is mainly the number of living beings in the target area.

Specifically, In the embodiment, the Fast Radial Symmetry (FRS) can be used to find seed points, and each seed point in the foreground area represents a target object.

Fast Radial Symmetry (FRS) is an image processing technique that detects highly radially symmetric points by analyzing the neighborhoods around each pixel in the image. It is used to detect symmetrical areas in the image and is particularly suitable for identifying objects or patterns with radial symmetry characteristics, such as human faces, flowers, the heads of certain animals, etc. Because it only focuses on the information on the radial path, not the entire image, this makes FRS computationally efficient and very useful in real-time applications, such as real-time detection and tracking of human faces in video streams. The basic idea of FRS is to use the symmetry of objects in the image, and identify symmetry by calculating the changes in pixel values on the radial lines (or paths) from the image center to the edge. The factors that affect the results of FRS mainly include:

Radius value: The size of the radius directly affects the detection range. A smaller radius may not capture the complete symmetry, while a larger radius may include more noise or irrelevant information.

Gaussian kernel size: The Gaussian kernel is used to smooth the image to avoid noise interference during the derivation process. The size of the kernel will affect the degree of smoothing, which in turn affects the accuracy of symmetry detection.

Radial strictness parameter: This parameter determines the strictness of the symmetry detection. A higher strictness value may exclude some areas that actually have symmetry, while a lower value may misjudge noise as symmetry.

Normalization factor: Normalization processing is used to balance the brightness differences in different areas. Different settings of the normalization factor will affect the final symmetry detection results.

Figure 3:
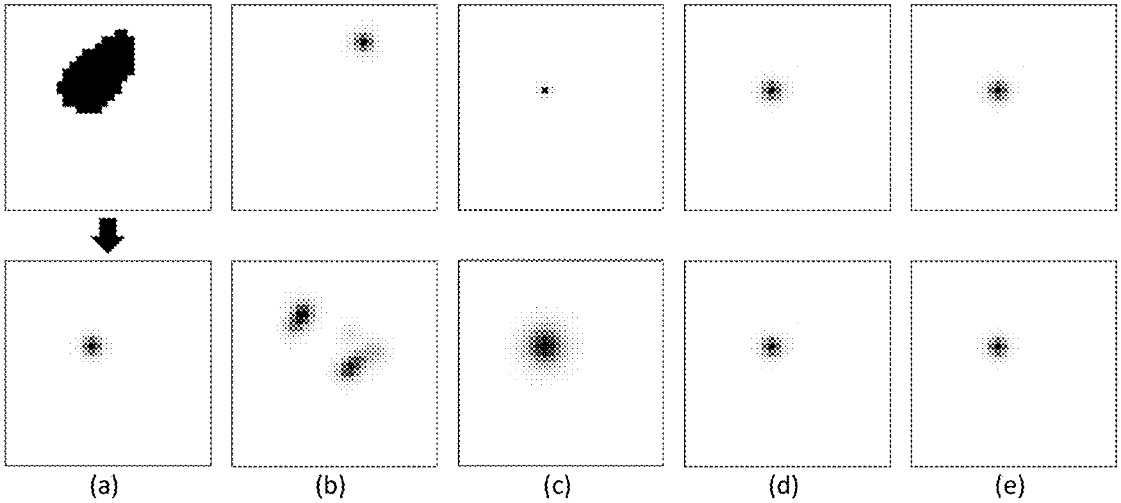
FIG. 3 shows the impact of different values of four parameters on the calculation of seed points regarding the fast radial symmetry (panels (a) to (e)).

Refer to FIG. 3. In practical applications, the inventor of the present application found that among all parameters, the radius value has a greater impact on the accuracy of finding seed points, while other parameters basically do not change the position of the seed points and basically do not affect the accuracy of the results. FIG. 3 shows the impact of different values of the four parameters on the calculation of seed points by Fast Radial Symmetry. Among them, (a) is the original result. The subsequent upper and lower images respectively represent the image processing results when the following parameters take smaller and larger values: (b) radius value; (c) Gaussian kernel size; (d) radial strictness value; (e) normalization factor value.

Figure 4:
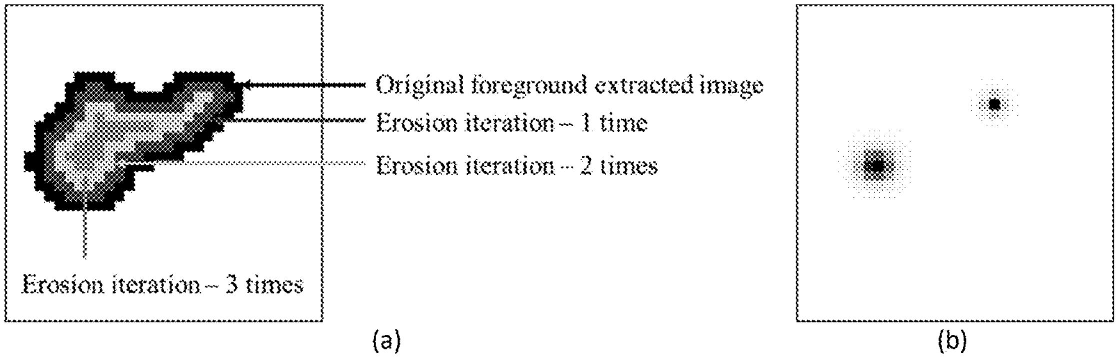
FIG. 4 shows the results after multiple erosion iterations have been performed on the infrared frames (panels (a) and (b)).

As shown in FIG. 4, to confirm the appropriate radius value, the system uses erosion iteration in mathematical morphology to process the image.

In mathematical morphology, erosion iteration is a basic image processing operation used to analyze and modify structural elements in the image. Erosion is a mathematical morphology operation that reduces the size of objects in the image or removes the small parts of objects by comparing each pixel in the image with its structural element. The structural element is usually a simple geometric shape, such as a rectangle, circle, or more complex shapes. Erosion iteration is the process of repeatedly performing erosion operations. Each iteration uses the same structural element to erode the image, which may cause the objects in the image to further shrink or lose details. The number of iterations can be adjusted as needed to achieve the desired effect.

The steps of erosion iteration are:

(1) Select a structural element S.

(2) Apply the erosion operation to the image B to obtain the eroded image B'.

(3) If further iteration is required, take B' as the new input image and repeat step (2).

In this embodiment, FIG. **4*a* shows the image of foreground extraction when two people with a height difference of about 90 cm are standing very close. It can be seen from the figure that the image areas of the two people are different in size. To find the optimal radius value, iterative erosion operation is performed using a 3×3 square structural element. Each erosion operation removes a layer of pixels from the edge of the foreground area. The stop condition for iteration is that all foreground pixels are removed by the erosion operation. The pixels of different colors in FIG. 4*a*** represent the pixels removed by each erosion operation. It can be seen from the figure that after 3 iterations, the foreground area becomes very small. In the 4th iteration, all pixels are removed and the erosion operation stops. The optimal radius value is defined as the number of iterations in the last iteration (i.e., 4 in this case). After defining the optimal radius value, the set of radii is from 2 to 6. That is to say, there is a two-pixel tolerance from the optimal radius value to cope with the size difference between the two areas. In this 32×32 resolution image, a two-pixel tolerance is appropriate. In other embodiments, for higher resolution images, a greater number of pixel tolerances can be set.

After defining the set of radii, seed points shown in FIG. 4*b* can be obtained through Fast Radial Symmetry.

Figure 5:
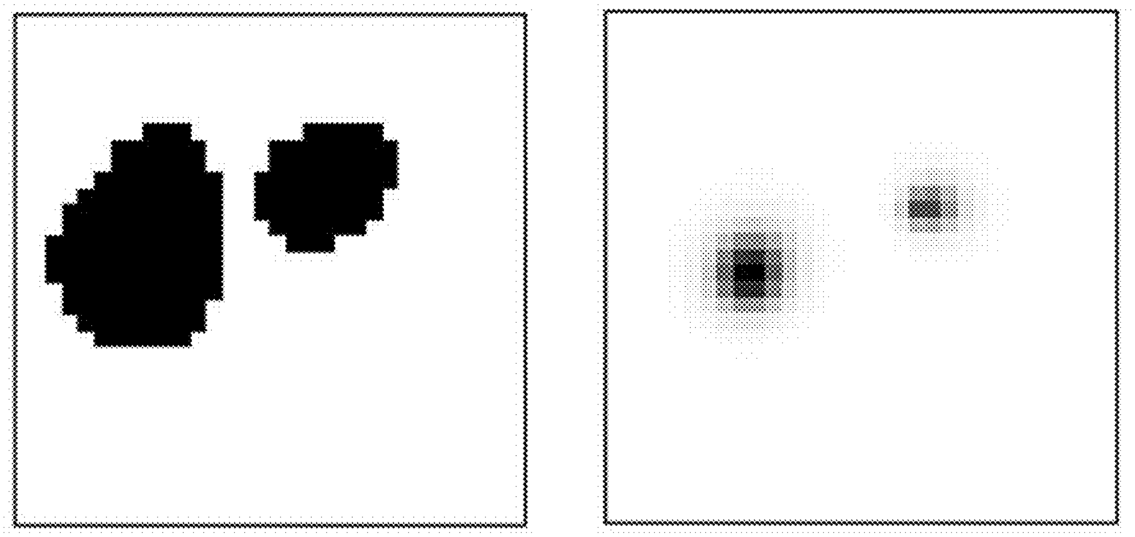
FIG. 5 shows an example of the image of the original infrared frame after preprocessing (left side) and after processing by step S6 (right side).
Figure 6:
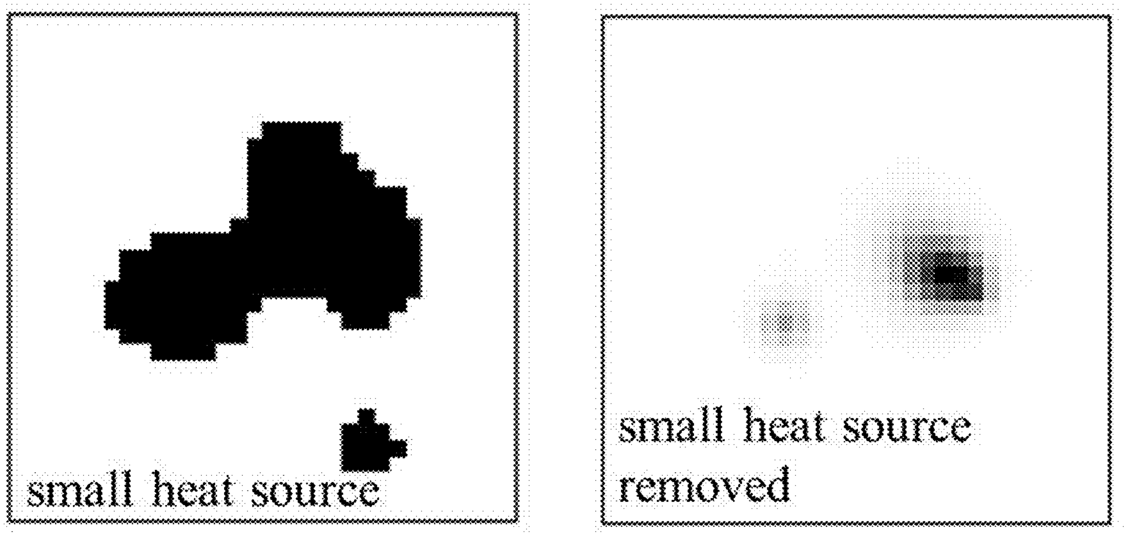
FIG. 6 shows another example of the image of the original infrared frame after preprocessing (left side) and after processing by step S6 (right side).
Figure 7:
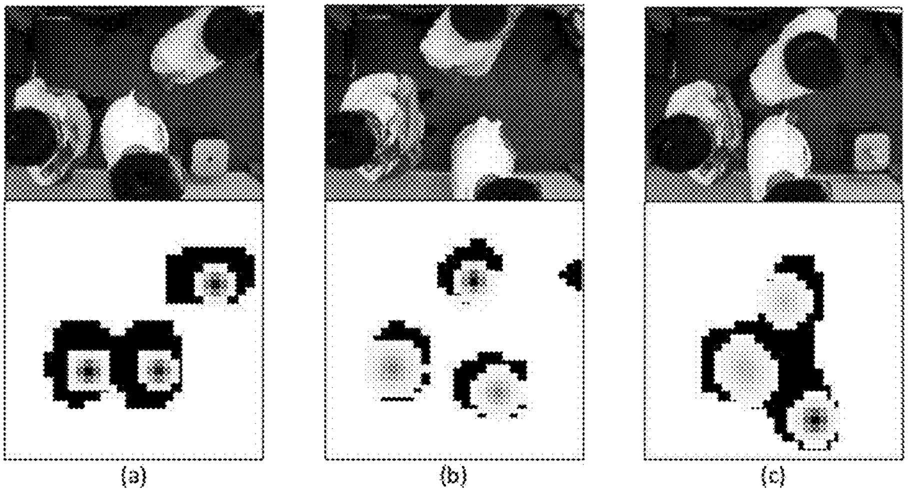
FIG. 7 shows an example of the original image corresponding to the infrared frame (top side) and the infrared frame after processing by step S6 (bottom side) (panels (a) to (c)).

Refer to FIGS. 5 to 7, the system demonstrates more results using the above methods.

In FIG. 5, the original image is two people standing apart from each other. The image on the left is the preprocessed image of the original image of the infrared device, and the image on the right is the schematic diagram of the seed points after processing step S6.

In FIG. 6, the original image is two people standing close to each other with a small heat source on the left side. The image on the left is the preprocessed image of the original image of the infrared device, and the image on the right is the schematic diagram of the seed points after processing step S6.

In FIG. 7, the original image is three people with different statuses. The original image corresponding to the infrared frame of the infrared device is the upper image, and the schematic diagram of the seed points after processing step S6 is the corresponding lower image. Among them, 7(*a*) is the image of three people standing apart. 7(*b*) is the image of three people standing apart, with one person holding a hot water cup (heat source); 7(*c*) is the image of three people standing close, with a hot water cup (heat source) placed at the lower right corner. From the corresponding images below, it can be seen that after processing step S6, the obtained seed points are accurate.

S7: Tracking the Target Objects

Based on S6, the system can track the target objects by matching the horizontal and vertical directions and speed of the seed points in the infrared frames from multiple infrared devices. Generally speaking, seed points with similar directions and speeds in multiple infrared frames from multiple infrared devices can be considered as the same target object, so their position changes can be tracked.

Figure 8:
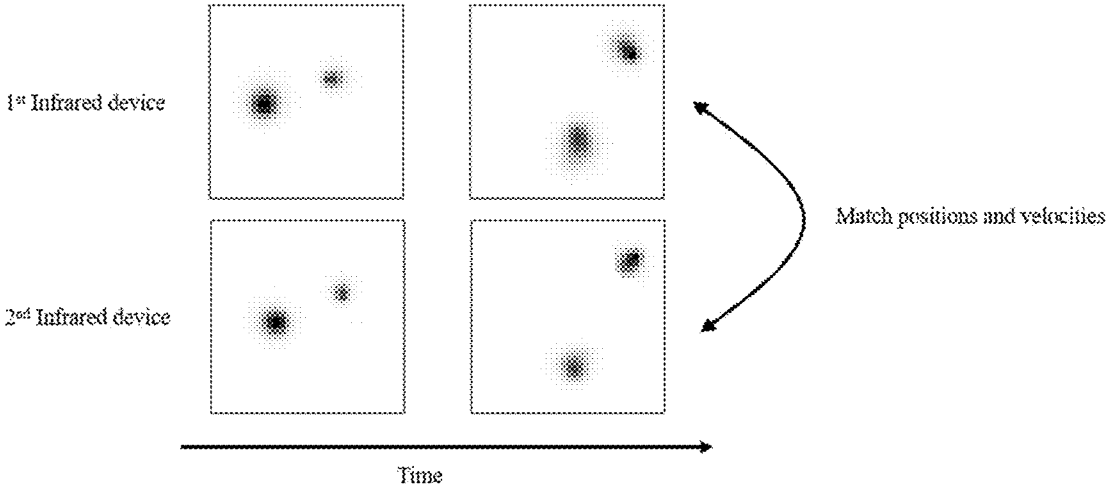
FIG. 8 shows a schematic diagram of the infrared frames for tracking the target object in the system.

Refer to FIG. 8, which shows two target objects that have moved to different positions over a period of time (four moments are recorded in the figure). With the tracking method of S7, the system can continuously track and record the positions of the target objects.

In summary, the system uses low-resolution infrared detection devices to detect, count, and track target objects. It not only uses low-cost low-resolution infrared detection devices but also uses appropriate algorithms to overcome the problems of low precision and low accuracy brought by low-resolution infrared devices, making the system have low cost and high precision detection effect.

Although the preferred configuration of the invention has been disclosed in accordance with the present description, it should be understood that various changes, modifications, and substitutions can be made without departing from the spirit of the invention as defined by the appended claims.

What is claimed is:

1. A detection method using a low-resolution infrared device, comprising the following steps:

S1: For each low-resolution infrared frame obtained, performing background removal according to preset rules to obtain an infrared frame that retain the pixels of the target object;

S2: Performing averaging processing on the infrared frame after background removal;

S3: Enhancing the resolution of the infrared frame after averaging processing;

S4: Extracting the foreground object;

S5: Comparing the number or proportion of pixels of the foreground object with a preset value, and if the number or proportion of pixels of the foreground object exceeds the preset value, confirming the detection of the target object.

2. The method according to claim 1, wherein in step S1, the preset rules comprises: taking the average value of each pixel value in each infrared frame;

In a single infrared frame, setting the pixel values of the pixel points within a preset range around the average value as background pixels, removing the pixel values of the pixels that are background pixels to 0, and retaining the pixel values of non-background pixels.

3. The method according to claim 2, wherein step S3 comprises:

S3.1 Interpolating the infrared frame processed by S2 to obtain an image with higher resolution and accuracy;

S3.2 Filtering the interpolated infrared frame to smooth the image.

4. The method according to claim 3, wherein the extraction of the foreground object in the infrared frame is completed by an Otsu binarization algorithm, average value method, or bimodal method.

5. A counting method using a low-resolution infrared device, comprising the detection method of claim 1, and further comprising:

S6: Using fast radial symmetry in the infrared frame to find seed points and obtain the number of target objects.

6. A tracking method using a low-resolution infrared device, comprising the counting method of claim 5, and further comprising:

S7: Analyzing the position, direction, and speed of seed points recorded in infrared frames from different devices, and tracking the same target object by considering seed points with similar direction and speed as the same target object.

7. A detection system using a low-resolution infrared device, comprising:

a low-resolution infrared device configured to capture low-resolution infrared frames of a target area;

a processor communicatively coupled to the low-resolution infrared device via wired or wireless communication to receive captured infrared frames, wherein the processor is programmed to sequentially carry out the following processing operations on each infrared frame;

performing background removal on the infrared frame according to preset pixel average threshold rules to generate a processed infrared frame retaining the pixel values of target objects;

executing pixel averaging processing on the infrared frame output after background removal;

enhancing the resolution of the averaged infrared frame through image interpolation and smoothing filtering;

extracting the foreground object pixels from the resolution-enhanced infrared frame by binarization processing; and comparing a number or proportion of pixels of the extracted foreground object with a preset threshold value, and confirming the detection of a target object if the number or proportion of pixels of the foreground object exceeds the preset threshold value.

8. The system according to claim 7, further comprising:

the preset pixel average threshold rules executed by the processor for background removal comprise:

calculating the average pixel value across all pixels of a single in each infrared frame;

defining pixels with pixel values falling within a preset range around the average pixel value as background pixels, setting the pixel values of the pixels that are background pixels to zero, and retaining the pixel values of non-background pixels.

9. A counting system using a low-resolution infrared device, comprising the detection system of claim 7, and further comprising:

wherein the processor is further programmed to execute a fast radial symmetry algorithm in the infrared frame to locate seed points and calculate a total number of target objects from the seed points.

10. A tracking system using a low-resolution infrared device, comprising the counting system of claim 9, and further comprising:

wherein the processor is further programmed to analyze the position, movement direction, and movement speed of seed points recorded in infrared frames captured by multiple low-resolution infrared devices, and associate seed points with similar direction and speed as a single identical target object to continuously track the target object across multiple frames and multiple infrared devices.

* * * * *